Sept. 18, 1956 F. M. WAGNON 2,763,117
TRAVELLING COMBINATION COTTON STRIPPING, GINNING, PRESSING
AND OTHER RELATED MECHANISMS
Filed June 30, 1955 5 Sheets—Sheet 1

INVENTOR.
FRANCIS M. WAGNON.
BY
Attorney.

Sept. 18, 1956
F. M. WAGNON
2,763,117
TRAVELLING COMBINATION COTTON STRIPPING, GINNING, PRESSING
AND OTHER RELATED MECHANISMS
Filed June 30, 1955
5 Sheets-Sheet 2
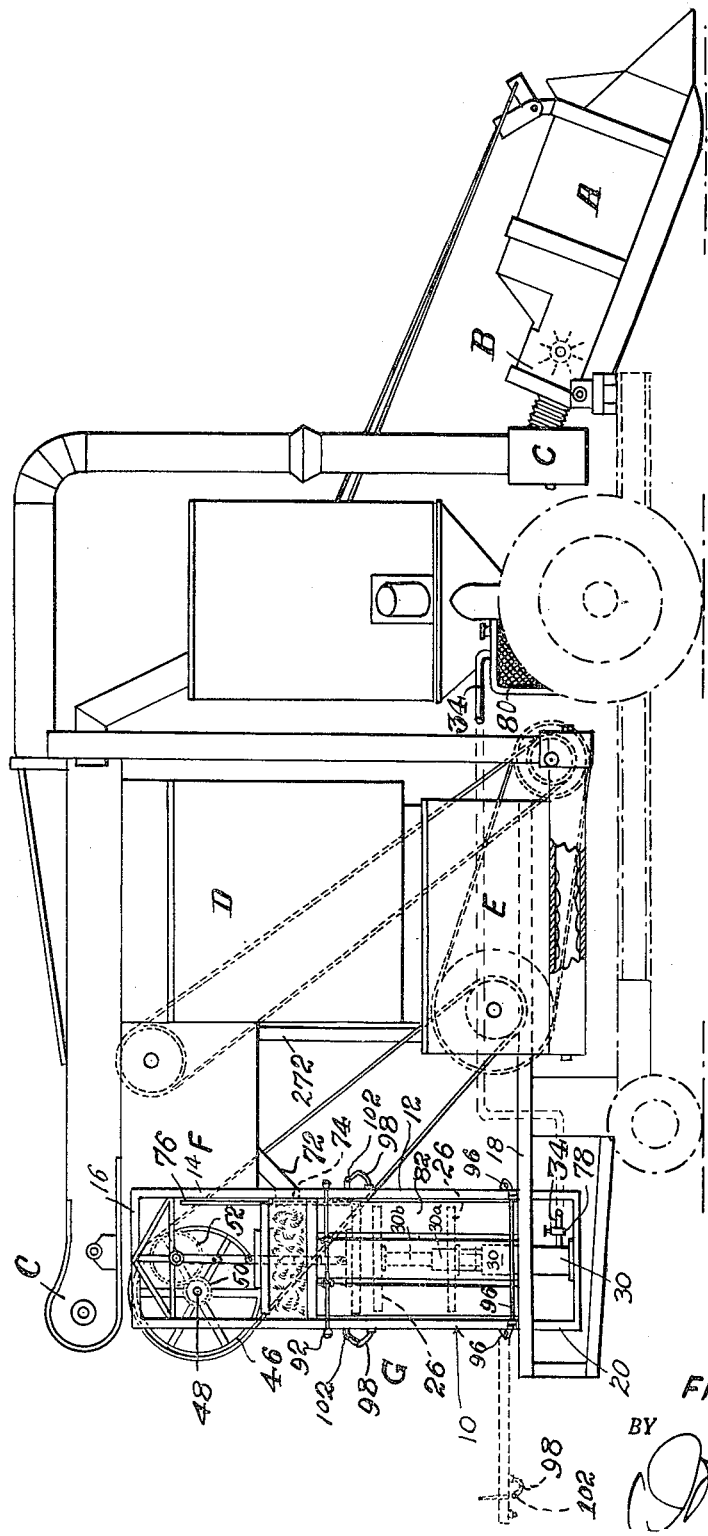
Fig. 2.
INVENTOR.
FRANCIS M. WAGNON.
BY

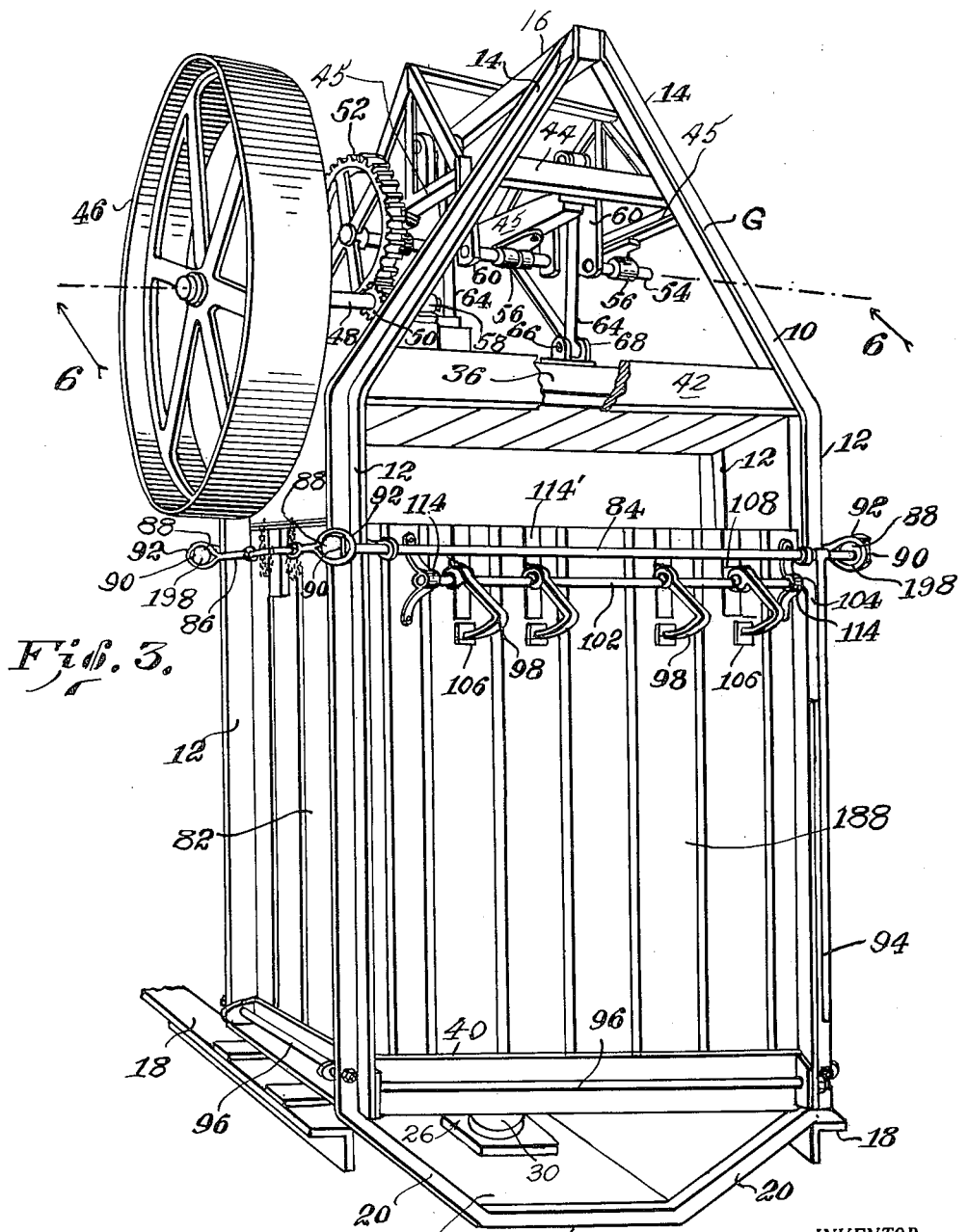

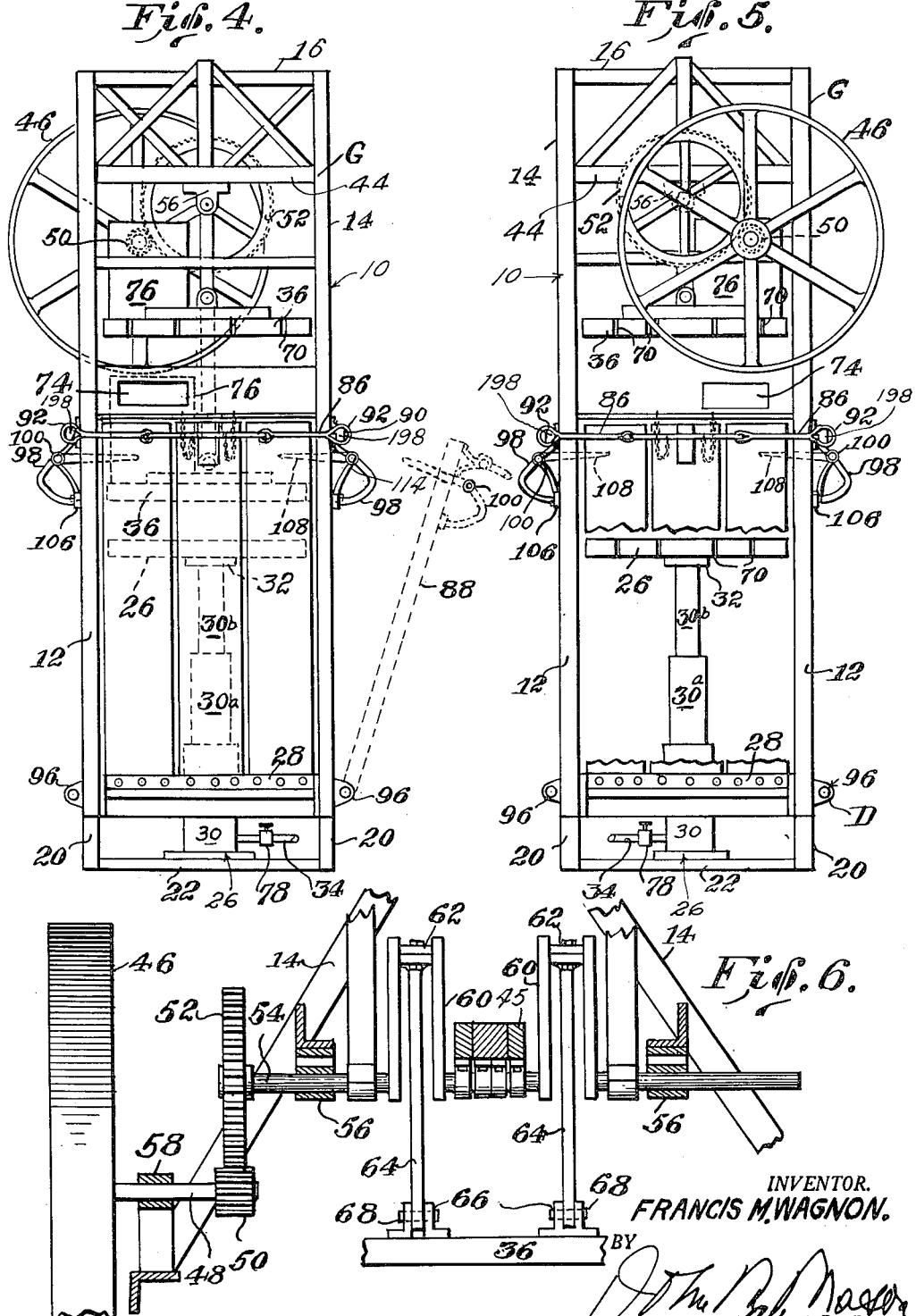

Sept. 18, 1956 F. M. WAGNON 2,763,117
TRAVELLING COMBINATION COTTON STRIPPING, GINNING, PRESSING
AND OTHER RELATED MECHANISMS
Filed June 30, 1955 5 Sheets-Sheet 5
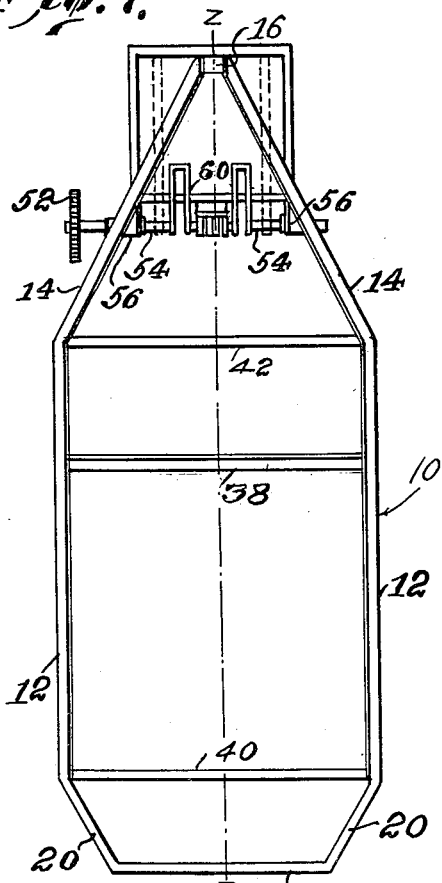
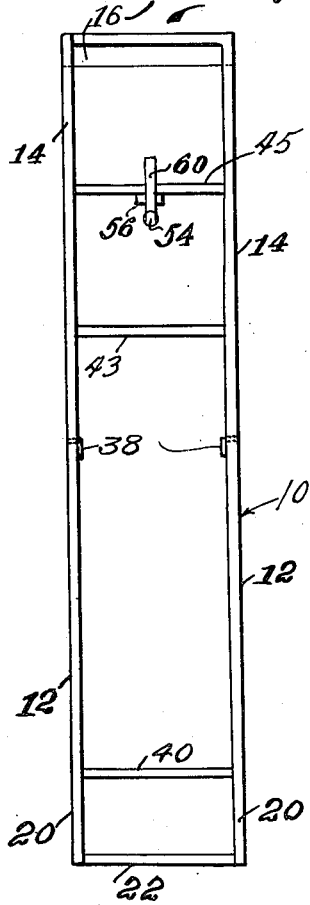
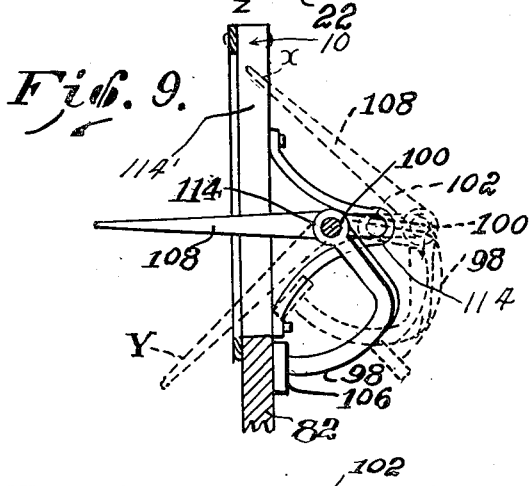
INVENTOR.
FRANCIS M. WAGNON.
BY
John M. Mason
Attorney.

United States Patent Office 2,763,117
Patented Sept. 18, 1956

2,763,117

TRAVELLING COMBINATION COTTON STRIPPING, GINNING, PRESSING AND OTHER RELATED MECHANISMS

Francis M. Wagnon, Borger, Tex.

Application June 30, 1955, Serial No. 519,132

28 Claims. (Cl. 56—30)

This invention relates to a travelling cotton harvester mechanism.

An object of the invention is to provide a machine which travels over the ground, which strips the cotton from the stalks, conveys the cotton to cleaning, ginning and other mechanisms, and which finally subjects the cotton to a pressing operation.

A further object is to provide in combination with a stalk stripper, means for conveying the cotton and extraneous material from the stripper means, with means to separate the cotton from said material during transit, with means to continuously subject the cotton during transit to a series of operations, and finally the means for subjecting the cotton to a pressing operation.

Yet another object is to provide in combination with a series of mechanisms for picking and treating cotton, an improved cotton pressing or baling mechanism.

Other objects will appear hereinafter throughout the specification.

In the drawings:

Figure 2 is a side elevation similar to Figure 1 but from the opposite side of said machine;

Figure 3 is an enlarged isometric view of the portable cotton compressing mechanism;

Figure 4 is a reduced side elevational view of the structure shown in Figure 3;

Figure 5 is a side elevational view of the structure shown in Figure 4 but from the opposite side thereof;

Figure 6 is an enlarged fragmentary view partly broken away of elements of the cotton compressing mechanism and the supporting means therefor;

Figure 7 is a front elevational view of the framework and some of the parts of the cotton compressing mechanism;

Figure 8 is an end elevational view of said framework;

Figure 9 is an enlarged fragmentary side elevational detail view partly in section of the cotton holding mechanism of the cotton compressor; and Figure 10 is a side elevational view of the drive shaft for the cotton holding mechanism shown in Figure 9.

Figure 1:
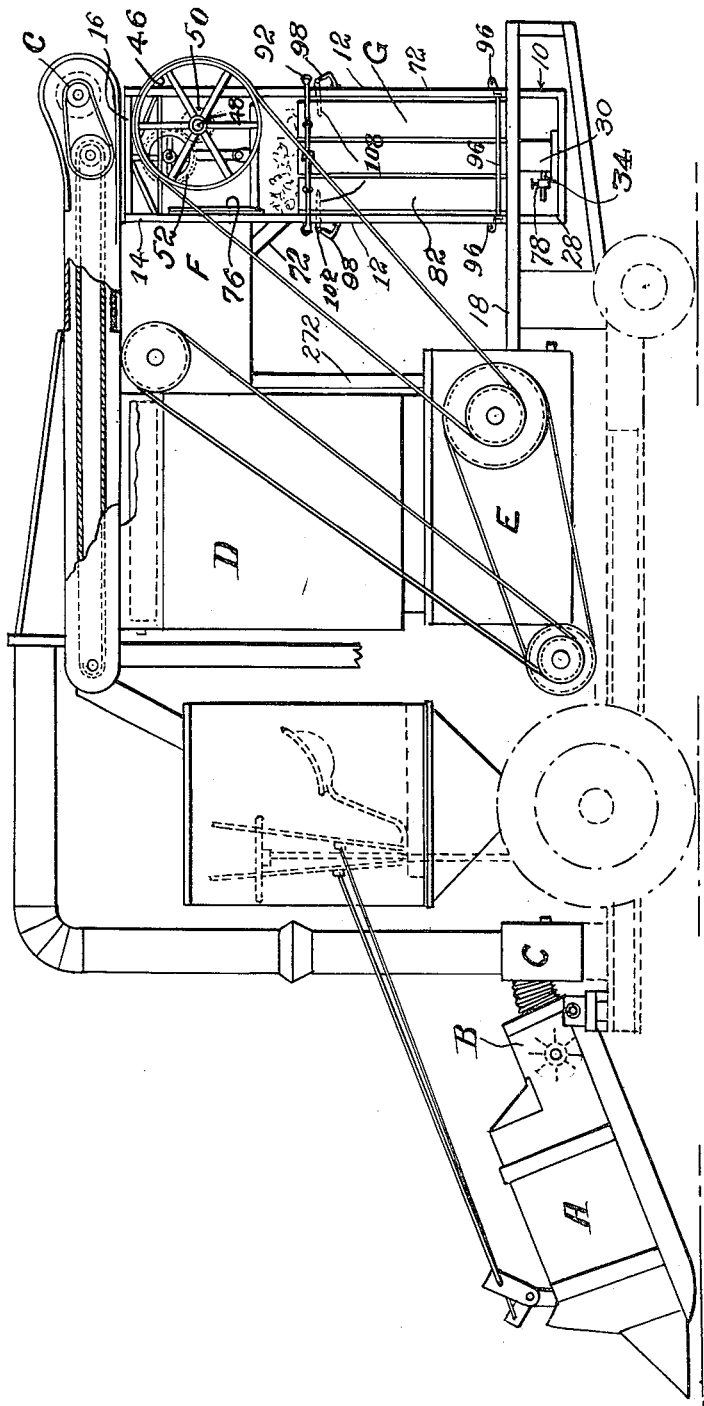
Figure 1 is a side elevational view of my improved cotton treating mechanism.

The problems relating to cotton harvesting mechanisms are many where the cotton is stripped from the stalks and completely processed by being separated from the bolls, fluffed, separated from leaves, twigs, and other debris, ginned, condensed and finally compressed or baled. Many of these problems have been solved by the structure disclosed in my prior Patent No. 2,707,364, granted May 3, 1955. The invention described and claimed herein solves other problems which make it possible to more efficiently, in a single operation, cause the cotton to be picked and subjected to a series of processing operations, the last one of which is the compressing of the cotton in a practical manner.

The device of this invention may be either self-propelled or drawn over the ground by a tractor or other towing means.

Referring to the drawings, A indicates the cotton picking means or stripper mechanism which separates the cotton from the standing stalks. After the cotton is stripped, it is subjected to an elevating conveyor fan unit, as shown at B, and is caused to move substantially vertically upward, after which its direction is changed and the cotton moves horizontally until it is engaged by a means for breaking the cotton bolls, namely the cotton boll breaker unit shown at C. The cotton is next subjected to a cotton separating and cleaning mechanism D, the lower part of which forms a cotton ginning means, namely the gin stand E. The ginned cotton is then led through conduit 272 into a cotton condenser means F, following which the condensed cotton is forced into the cotton pressing means G, hereinafter referred to as the baler.

The location of the several instrumentalities may be similar to those of my patent above referred to except that in the present combination, the condenser F is located closely adjacent to one side of the cotton condenser means G. It will be appreciated, however, that the location of these elements A to G depends upon circumstances as certain of them may be located on a trailer. The cotton compressing means may be on its side instead of being in an upright position as shown, inasmuch as it is only necessary that the conveying pipes that connect to the inlets and exits of them be connected to insure a continuous operation. The exact location and position of these instrumentalities A, B, C, D, E, F and G forms no part of the present invention, except that the cotton gathering means A must be so located as to gather the cotton before the machine has passed over the standing stalks. Additionally, the units may be mounted on one, two, or more conveyances, but require pipe connections to all of them in order to insure that the cotton be cleaned, ginned, condensed and finally compressed in a single continuous operation.

The baler, as noted in Figures 1 and 2, is mounted on the rear portion of the vehicle chassis so that the baled cotton may be deposited on the field, or into a trailer that may be towed behind the harvesting mechanism, not shown.

The baler is provided with a framework, designated generally by the numeral 10 forming a press box comprising a rectangular frame which preferably includes four angled, parallel side members 12 at the four corners. At opposite ends of the baler, pairs of these members 12 are inclined inwardly at 14 to engage the horizontally extending support 16.

Forming part of the vehicle chassis or framework are horizontal extensions 18 that support the baler, as shown in Figure 3, and it will be understood that the baler may be attached to these extensions by any suitable means, such as by welding or by bolts. The parallel side members 12 have inwardly converging members 20 and a transversely extending portion 22 which latter supports a platform 24 on which is mounted the hydraulically actuated, pressure responsive supporting member 26, shown best in Figures 4 and 5.

Seated on the platform 24 is the hydraulic mechanism 28. Such mechanism may be of any suitable type but it preferably comprises a series of moving telescopic parts 30, 30a and 30b the uppermost one of which has a head 32 which is fixedly attached to the pressure responsive supporting member 26, as shown in Figure 5. Hydraulic mechanism, for actuating the telescopic parts 30, is connected to a pressure line indicated at 34, whose opposite end is connected to any conventional press operating mechanism, including a pump and the motor therefor, as shown at 80 in Figure 2.

Interposed in the line 34 is a pop-off or pressure relief valve 78. The upper pressing member, as shown in Figure 3 and other figures, is indicated by the numeral 36. This member 36 has been shown as movable vertically by the mechanical means hereinafter described, but it will be understood that hydraulic or other actuating means may be substituted therefor. The framework 10 is provided with horizontal braces including the brace or support 16 heretofore mentioned and the brace 38. Additional braces are shown at 40, 42 and 43, some of the latter extending transversely to brace 16. Some of the braces 42 and 43 are welded or otherwise rigidly supported between the pairs of inwardly inclined members 14. The mechanism is further braced by two pairs of horizontal brace members 44 and 45 that extend, respectively parallel and at a right angle to members 42, as seen in Figure 3.

Mounted on this superstructure, which must necessarily be thoroughly braced because of the immense pressures used, is the off-take drive wheel 46 that may be driven by the same off-take drive which drives the stripper mechanism, elevating conveyor, cotton boll breaker, and other elements of the cotton harvesting and cleaning mechanism. This wheel is mounted on a shaft 48 as shown in Figures 1 and 2 by a spline so as to rotate the shaft 48 and the gear 50 splined thereto. Gear 50 forms the drive gear for the pinion gear 52, which latter is splined to the crank shaft 54, and the latter is supported by bearings 56 supported from horizontal brace members 45. It should be noted that drive shaft 49 and wheel 46 are supported by suitable bearing means 58.

Referring to Figure 6, the crank portions 60 are connected by crank shaft bearing 62 to connecting rod 64, the lower ends of which are pivotally connected at 66 to the reciprocating pressing member 36 by means of bearing pins 68. Both the pressure responsive supporting member 26 and the reciprocating pressing member 36 are provided with slots 70 which extend entirely through these members. This permits air to move through the slots during the compressing operation.

Referring to Figure 1, it will be noted that the cotton condenser means F has a means 72 leading from the cotton ginning means E into the said condenser, and a means 74 leading from said condenser means to the cotton pressing means, as seen in Figure 4. Attached to said reciprocating member 36 is a cover plate or valve member 76 as shown in Figure 4. This valve member is of such size and shape that, as soon as the pressure responsive supporting member 26 starts to move downwardly, i. e., upon each downward reciprocation thereof, the opening 74 from the condenser is immediately covered by the cover plate 76 so as to prevent the entrance of cotton at this time. Then, when the reciprocating pressing member moves back to its top position, the opening forming the inlet to the cotton press is opened again and cotton moves from the condenser F through the opening 74 into the press and on top of the pressure responsive supporting member 26.

This pressure responsive supporting member 26 is supported by the telescoping parts 30, 30a and 30b of the hydraulic mechanism, and the said member 26 holds the pressure responsive supporting member in the position shown in Figure 5 at the beginning of the pressing of each bale of cotton. As the reciprocation of the reciprocating pressing member continues, the pressure responsive supporting member 26 becomes gradually lower in the press as fluid is forced out of the telescopic parts 30, 30a and 30b of the ram and this fluid, which may be either gas or a liquid, escapes from the manually adjustable relief means that includes a pop-off valve 78, shown in Figure 3. Preferably a liquid is used and the liquid escaping from the valve 78 is caught by a pan or receptacle of some sort, not shown, and is conveyed back by suitable means to the pump, which latter has been indicated diagrammatically in Figure 2 at 80. The engine which drives the pump also preferably furnishes the motor power for driving each of the mechanisms A, B, C, D, E and F.

Referring particularly to Figure 3, the press is composed of a plurality of pivoted sides 188 with slats 82 which are preferably held at their upper ends by bars 84 and 86. The ends of the bars 84 are provided with heads 198, each having an enlarged side 88, and opposite cut-off sides 90. Bars 86 are articulated in the form of links as shown in Figure 3, and the ends are provided with loops 92, the arrangement being such that when the bars 84 are rotated to the position shown in Figure 3, each enlarged side 88 engages the sides of its loop, but when the bar 84 is rotated through a ninety degree angle, the cut-off sides 90 do not engage the narrower sides of the loop, and the loops will therefore slide easily out of the enlarged sides 88. Each bar 84 is rotated from a position shown in Figure 3 to that of a ninety degree angle thereto by means of its elongated lever 94, each attached to bar 84. When this is done, each of the sides may rotate on its pivot 96, shown in Figures 4 and 5. The bearings for the sides are attached to the upwardly extending members 12. One of the sides has been released as shown in dotted lines in Figure 4.

As will be noted by reference to several of the figures, particularly Figures 3 and 9, there is provided a series of dogs 98, which move in slots 114' in the sides 188. Each dog is pivoted on the crank portion 100 of a small crank 102, shown in detail in Figure 10. The ends of the crank are mounted in bearings 114 on the opposite end slats of its side 188. The shaft 102 has an extension or handle 104, shown in Figure 3.

Referring again to the dogs 98, each dog has a foot 106 which is adapted to bear against its slat 82, as shown in Figure 9, when the dogs are in one position. When the shaft 102 is rotated, however, the crank portions 100 thereof swing the dogs back to the dotted line position shown in Figure 9, with the projecting finger 108 in the position shown in dotted lines. Each of the dogs 98 is freely rotatable on the crank portion 100 of the crank.

It will be noted, by reference to the figures, such as Figures 4 and 5, that the dogs 98 and cranks 100 are only mounted on the longer sides of the press box.

The above structure provides a cotton box that is both strong and efficient, and which is light enough in weight so that it can be produced at a reduced cost over existing press boxes and may be readily supported, together with the other parts of the apparatus, as lettered A–F, respectively, on a single chassis if desired. The press box has a potential strength of one hundred tons or more.

Operation

At the beginning of the operation of pressing or baling the cotton, lagging is placed on the cotton engaging surface of the pressure responsive supporting member or press board 26, and when the box is full of cotton which has been pressed into a bale, the reciprocating pressing member or press board 36 is stopped by discontinuing rotation of the wheel 46, and a second piece of lagging is spread over the top of the dogs 98 when the dogs are shown as extending in a horizontal direction and in the full line position shown in Figure 9. It will be understood, however, that the press need not be mounted in a vertical position but may be mounted in any position, including an inclined position, or a horizontal position. In all cases, the lagging is spread between the dogs and the reciprocating pressing member.

Power is now applied to the wheel 46 to cause the upper press board to reciprocate vertically, and when this takes place, the dogs which are mounted on each of the sides 88 are released by moving the extension or handle 104 upwardly, the dogs then moving into the dotted line position shown in Figure 9 at X.

Extension or handle 104 is now moved upwardly to release its side, or both sides of the press are released by upward movement of both handles. This release takes place as stated above, due to the fact that the cut-off sides 90 are in the larger ends of the loops 92, thus permitting the loops to be released. All four sides are then released and are opened. Ties are next placed around the bale of cotton by inserting the ties through the slots 70 in the pressing members 26 and 36. The ties are placed around the bale of cotton and tied. At this time, the reciprocating pressing member has moved to the position where the opening 74 has been closed by the cover plate 76.

During the first stages of pressing, the pressure responsive supporting member is in its extended position, i. e., at the limit of its upward movement as viewed in Figure 5. When the cotton is just beginning to bale up on top of the pressure responsive supporting member, as the reciprocating pressing member is continuously reciprocated in a vertical direction, assuming that the parts are shown as indicated in the several figures wherein the pressing operation takes place in a vertical plane, a layer of cotton about an inch or less will be pressed during each reciprocation of the member 36. The first layer of cotton is pressed at its average density and additional layers are pressed during each reciprocating movement of the reciprocating pressing member until the box is full of pressed cotton.

Before this condition has been reached, as the pressing operation proceeds, the pressure responsive supporting member 26 moves gradually downwardly as the sections 30, 30a and 30b telescope, bleeding fluid through pop-off valve 78, where it is caught by a suitable pan and returned by gravity to the oil or other liquid reservoir. The sole purpose of the hydraulic jack is to move the pressure responsive supporting member 26 to the limit of its movement toward the reciprocating pressing member, as shown in Figure 5, and provide a cushion for the cotton as it is pressed by the reciprocation of the reciprocating press board 36, it being understood that cotton is intermittently led into the baling mechanism until the maximum amount of cotton has been received, the cotton being held back by the member 76 upon each reciprocation of the reciprocating member 36. The cotton is fed, however, continuously up to this point by the various mechanisms A, B, C, D, E and F, the period of feed being momentarily interrupted by the movement of the part 76 in closing the opening from the unit F to the unit G, i. e., each time the member 36 moves downwardly.

Each reciprocation of the reciprocating press board 36 closes the cotton opening when the cover plate 76 on the board 36 has approached the pressure responsive supporting member 26 to its maximum extent and even shortly before this has taken place.

It will be noted that the pop-off valve 78 may be adjusted so as to change the density of the bale of cotton being baled.

The operation of the dogs is similar to the operation of other dogs in cotton presses and the present invention is not concerned with this operation, the dog operation being conventional in the pressing art.

Another important feature of the invention is the construction of the frame which encloses the cotton during the baling operation, particularly frame pieces 12, 14, 20 and others. It will be noted that all of the tension and pressure is applied lengthwise of the bale, which is a new principle in the baling of cotton, and that pressure against the cotton, both by the hydraulic or fluid actuated mechanism, and the reciprocating press board 36, tends to place these members under tension. During the pressing operation, no pressure is developed which is transverse to the longitudinal axis Z—Z of the framework as seen in Figure 7. If there is any sidewise pressure developed, it is a pressure which tends to pull the frame transversely inwardly of the frame members 12, but this pressure is resisted by the cotton and by the upper and lower pressing members 36 and 26.

It will be understood that a trailer may be used which may be pulled by a machine mounting the cotton picking means, which may mount any one or more of the following instrumentalities, including the cotton boll breaking means or separating means, the cotton boll extractor means, the cotton ginning means, the cotton condenser means and the cotton press means. It should be emphasized, however, that applicant's combination is directed to a travelling machine means including one or more conveyances which move over the ground as a single unit and which pick the cotton, break the cotton bolls, extract the cotton, gin the cotton, condense the cotton, and press the cotton into a bale or other similar article in a continuous operation.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a travelling cotton harvesting mechanism having a cotton picking means for picking cotton and a cotton extractor means for extracting cotton, conveying means interconnecting said picking means and said extractor means, said cotton extractor means having a cotton outlet means, a cotton ginning means for ginning cotton operatively associated with said cotton extractor means and having a cotton outlet means, a cotton condenser means for condensing cotton operatively connected to said cotton ginning outlet means, said cotton condenser means having an outlet means for cotton and press means for compressing cotton operatively connected to said last named outlet means, said press means comprising a press box having a lateral opening operatively associated with the outlet means from said condenser, a pressure responsive supporting member movable in said box below said opening and a reciprocating pressing member movable in said box from an upper limit of movement above said opening to a point below said opening.

2. In a travelling cotton harvesting mechanism having a cotton picking means for picking cotton, a cotton boll breaking means for breaking cotton bolls and a cotton extractor means for extracting cotton, conveying means interconnecting said picking means, cotton boll breaking means, and said extractor means, said cotton extractor means having a cotton outlet means, a cotton ginning means for ginning cotton operatively associated with said cotton extractor means and having a cotton outlet means, a cotton condenser means for condensing cotton operatively connected to said cotton ginning outlet means, said cotton condenser means having an outlet means for cotton and press means for compressing cotton operatively connected to said last named outlet means, said press means comprising a press box having a lateral opening operatively associated with the outlet means from said condenser, a pressure responsive supporting member movable in said box below said opening and a reciprocating pressing member movable in said box from an upper limit of movement above said opening to a point below said opening.

3. In combination with a cotton combine comprising cotton picking means, cotton cleaning means, cotton ginning means, and cotton condensing means having a cotton outlet means, a cotton press means operatively connected to said outlet means, said press means comprising a press box having a lateral opening operatively associated with the outlet means from said condenser means, a pressure responsive supporting member movable in said box on one side of said opening, and a reciprocating pressing member movable in said box from a limit of movement on the opposite side of said opening to a point on the said one side of said opening.

4. The structure of claim 1, wherein said press box includes a rectangular framework having substantially parallel corner members, said press box having ends, one of said ends including converging members forming extensions of said corner members, and means on said converging members for mounting said pressing member, whereby to retain said pressing member in operative position during the movements thereof.

5. The structure of claim 2, wherein said press box includes a rectangular framework having substantially parallel corner members, said press box having ends, one of said ends including converging members forming extensions of said corner members, and means on said converging members for mounting said pressing member, whereby to retain said pressing member in operative position during the movements thereof.

6. The structure of claim 3, wherein said press box includes a rectangular framework having substantially parallel corner members, said press box having ends, one of said ends including converging members forming extensions of said corner members, and means on said converging members for mounting said pressing member, whereby to retain said pressing member in operative position during the movements thereof.

7. The structure of claim 1, wherein said press box includes a rectangular framework having substantially parallel corner members, said press box having ends, both of said ends including converging members forming extensions of said corner members, and means on said converging members for mounting said pressure responsive supporting member and said reciprocating pressuring member whereby to retain said last named members in operative position during the movements thereof.

8. The structure of claim 2, wherein said press box includes a rectangular framework having substantially parallel corner members, said press box having ends, both of said ends including converging members forming extensions of said corner members, and means on said converging members for mounting said pressure responsive supporting member and said reciprocating pressing member whereby to retain said last named members in operative position during the movements thereof.

9. The structure of claim 3, wherein said press box includes a rectangular framework having substantially parallel corner members, said press box having ends, both of said ends including converging members forming extensions of said corner members, and means on said converging members for mounting said pressure responsive supporting member and said reciprocating pressing member whereby to retain said last named members in operative position during the movements thereof.

10. The structure of claim 1 wherein said press box includes four substantially parallel members forming a rectangular box, pairs of said members being inclined inwardly toward each other at opposite ends of said box.

11. The structure of claim 2 wherein said press box includes four substantially parallel members forming a rectangular box, pairs of said members being inclined inwardly toward each other at opposite ends of said box.

12. The structure of claim 3 wherein said press box includes four substantially parallel members forming a rectangular box, pairs of said members being inclined inwardly toward each other at opposite ends of said box.

13. The structure of claim 1 wherein said press box includes four substantially parallel members forming a rectangular box, pairs of said members being inclined inwardly at both ends to form supporting members, and means mounting said pressure responsive supporting member at one end on said inclined members, and means for mounting said reciprocating pressing member at the opposite end on said inclined members.

14. The structure of claim 2 wherein said press box includes four substantially parallel members forming a rectangular box, pairs of said members being inclined inwardly at both ends to form supporting members, means mounting said pressure responsive supporting member at one end on said inclined members, and means for mounting said reciprocating pressing member at the opposite end on said inclined members.

15. The structure of claim 3 wherein said press box includes four substantially parallel members forming a rectangular box, pairs of said members being inclined inwardly at both ends to form supporting members, means mounting said pressure responsive supporting member at one end on said inclined members, and means for mounting said reciprocating pressing member at the opposite end on said inclined members.

16. The structure of claim 1, wherein said press box includes a plurality of substantially parallel members extending longitudinally of said press means, said members being inclined inwardly at one of the ends of said press box to form supporting portions, and means operatively supporting said reciprocating pressing member on said supporting portions.

17. The structure of claim 2, wherein said press box includes a plurality of substantially parallel members extending longitudinally of said press means, said members being inclined inwardly at one of the ends of said press box to form supporting portions, and means operatively supporting said reciprocating pressing member on said supporting portions.

18. The structure of claim 3, wherein said press box includes a plurality of substantially parallel members extending longitudinally of said press means, said members being inclined inwardly at one of the ends of said press box to form supporting portions, and means operatively supporting said reciprocating pressing member on said supporting portions.

19. The structure of claim 1, wherein said press box includes parallel sides and converging ends, means for supporting said pressure responsive supporting member in one of said ends and said reciprocating pressing member in the other of said ends, and a plurality of pivoted dogs supported on said sides and extending into the interior of said press box, at least one of said sides having pivoted portions and releasable means for releasing said side whereby the same may pivot to release a bale of cotton following the baling operation.

20. The structure of claim 2, wherein said press box includes parallel sides and converging ends, means for supporting said pressure responsive supporting member in one of said ends and said reciprocating pressing member in the other of said ends, and a plurality of pivoted dogs supported on said sides and extending into the interior of said press box, at least one of said sides having pivoted portions and releasable means for releasing said side whereby the same may pivot to release a bale of cotton following the baling operation.

21. The structure of claim 3, wherein said press box includes parallel sides and converging ends, means for supporting said pressure responsive supporting member in one of said ends and said reciprocating pressing member in the other of said ends, and a plurality of pivoted dogs supported on said sides and extending into the interior of said press box, at least one of said sides having pivoted portions and releasable means for releasing said side whereby the same may pivot to release a bale of cotton following the baling operation.

22. The structure of claim 1, wherein said pressure responsive supporting member includes hydraulic means including a pop-off relief means whereby to permit said pressure responsive member to move away from said reciprocating pressing member as the pressing operation progresses.

23. The structure of claim 2, wherein said pressure responsive supporting member includes hydraulic means including a pop-off relief means whereby to permit said pressure responsive member to move away from said reciprocating pressing member as the pressing operation progresses.

24. The structure of claim 3, wherein said pressure responsive supporting member includes hydraulic means including a pop-off relief means whereby to permit said pressure responsive member to move away from said reciprocating pressing member as the pressing operation progresses.

25. The structure of claim 1, wherein said pressure responsive supporting member includes hydraulic means including a pop-off relief means having manual means for regulating the degree of responsiveness of said pressure responsive supporting member.

26. The structure of claim 2, wherein said pressure responsive supporting member includes hydraulic means including a pop-off relief means having manual means for regulating the degree of responsiveness of said pressure responsive supporting member.

27. The structure of claim 3, wherein said pressure responsive supporting member includes hydraulic means including a pop-off relief means having manual means for regulating the degree of responsiveness of said pressure responsive supporting member.

28. In combination with a cotton combine comprising cotton picking means, cotton cleaning means, cotton ginning means, and cotton condensing means having a cotton outlet means, a cotton press means operatively connected to said outlet means, said press means comprising a press box having a lateral opening operatively associated with the outlet means from said condenser means, a pressure responsive supporting member movable in said box on one side of said opening, a reciprocating pressing member in said box, and a cover means on said pressing member movable in said box from a limit of movement on the opposite side of said opening to a point on the said one side of said opening.

References Cited in the file of this patent
UNITED STATES PATENTS

| | | |
|---|---|---|
| 532,750 | Banister | Jan. 22, 1895 |
| 689,269 | Williams | Dec. 17, 1901 |
| 691,430 | Zoder et al. | Jan. 21, 1902 |
| 1,006,593 | Pleasant | Oct. 24, 1911 |
| 1,314,437 | Silverthorne | Aug. 26, 1919 |
| 1,706,663 | Hancock | Mar. 26, 1929 |
| 2,209,740 | Steinhauer | July 30, 1940 |
| 2,707,364 | Wagnon | May 3, 1955 |